Nov. 30, 1965 W. C. MOORE ETAL 3,220,888
RECHARGEABLE BATTERY PACK
Filed Sept. 20, 1962

INVENTORS.
WILLIAM C. MOORE
BY WILLIAM S. PILGRIM

United States Patent Office 3,220,888
Patented Nov. 30, 1965

3,220,888
RECHARGEABLE BATTERY PACK
William C. Moore, Skaneateles, and William S. Pilgrim, Port Byron, N.Y., assignors to Welch Allyn, Inc., Skaneateles Falls, N.Y., a corporation of New York
Filed Sept. 20, 1962, Ser. No. 225,096
7 Claims. (Cl. 136—173)

This invention relates to a novel battery replacement pack for devices which utilize rechargeable batteries as a source of power. More particularly, it relates to a unitary replacement pack for rechargeable battery handles or the like, which pack contains a plurality of rechargeable cells and includes positive means for preventing misorientation of the pack in the handle.

In recent years, sealed rechargeable batteries have come into extensive use in portable electric devices of all types. One reason for the increasing popularity of this type of battery is that its life expectancy is substantially longer than that of the conventional, non-rechargeable dry cell, and many manufacturers have operated on the assumption that rechargeable batteries are capable of several thousand hours of use without wearing out. As a result of this assumption, a good many electrical devices have been designed so that the rechargeable batteries are permanently built into the device and no provisions is made for removal and replacement by the user.

It has been found, however, that rechargeable batteries frequently wear out before the device or instrument with which they are used, and often in a far shorter period than their expected life span. When this happens, it means that the entire instrument must be discarded and replaced which is wasteful, or the user must go to the inconvenience of returning it to the factory to have new batteries installed. In many of these devices, moreover, as for example in certain types of flashlights and the like, the device is adapted to be recharged by being plugged directly into a wall outlet and such instruments normally include a built-in transformer and rectifier as well as the built-in batteries. Obviously, devices of this type are initially quite expensive and should not simply be discarded because the batteries have worn out.

The present invention affords a solution to the problem noted above by providing for rechargeable devices an economical replacement pack or package of rechargeable batteries, which pack can be conveniently substituted for worn out batteries by the user thereby eliminating the need for returning the device to the factory or the waste involved in discarding a device which, except for the batteries, is still in good working order. This replacement battery pack has a unitary construction and contains a plurality of matched rechargeable batteries or cells, the number of batteries depending on the device with which the replacement pack is to be used. Moreover, because proper orientation of the batteries is essential in a rechargeable device, the battery pack of the invention is constructed in such a manner that it is impossible for anyone to install it improperly.

In a rechargeable device such as a battery handle for electrically illuminated diagnostic instruments, the rechargeable batteries are arranged in series and, as in an ordinary flashlight, the handle will illuminate an instrument connected thereto regardless of whether the positive or negative terminal of the battery series is uppermost in the handle. However, in order to recharge the batteries, they must be properly oriented in the battery handle because the charge must be through the positive terminal and the latter must therefore engage the contact in the battery handle or other rechargeable device through which the charge is delivered from an outside source.

In one type of rechargeable battery handle, for example, the handle is provided with a specially adapted recharger unit and, when not in use, the handle is placed in the unit for storage and for recharging the batteries. The recharger unit operates through the battery handle to connect the batteries in a recharging circuit so that the batteries are kept ready for use at peak efficiency. When the handle is placed in the recharger unit, however, it is essential that the positive terminal of the battery series be in contact with the positive or charging contact provided in the handle.

The recharger unit referred to above contains all the elements of the recharging circuit except the batteries. When the handle is placed in the recharger unit, the batteries are included in the recharging circuit through the battery handle casing which is connected to one side of the battery series, and through cooperating insulated contacts in the unit and handle to the other side of the battery series. Thus, the batteries must be correctly oriented in the handle as to polarity in order that there be no polarity error which may damage the batteries or prevent them from being recharged.

Battery holders or boxes for correctly aligning or ordering a plurality of dry cells in series no matter how disposed in the holder are known in the art, but commercially available rechargeable batteries are presently so constructed as to preclude their use in such devices. A further problem is that such holders must themselves be properly oriented in relation to the equipment for which they are supplying power or the latter will be inoperative.

Means also are known in the art for placing a single rechargeable battery in a recharging circuit so that the battery will be oriented correctly for recharging, but such means require specially constructed batteries. The batteries must be placed separately in the recharger and no provision has been made for a plurality of batteries which may conveniently remain in a rechargeable device and all be placed together in the recharging circuit.

Furthermore, in the interest of economy and good faith with the many past purchasers of battery handles and similar rechargeable devices, it is essential that provision be made for supplying replacement batteries in a form which may be used in new handles and likewise be used in battery handles and with recharger units already in use.

According to the present invention these problems can all be solved by providing a sealed pack in which the batteries have been prearranged in series at the factory, and which pack is provided with means for connecting the positive terminal of the battery series with the charging contact in the battery handle and connecting the negative terminal of the battery series with the casing of the handle no matter which end of the pack is first inserted in the handle.

It is the primary object of the present invention, therefore, to provide a simple, unitary replacement pack of rechargeable batteries for rechargeable devices having convenient means for gaining access to the batteries.

Another important object of the invention is to provide a convenient and economical pack of rechargeable batteries for use in battery handles or other rechargeable devices, in which pack the batteries are pre-arranged as to polarity and permanently secured together so that the pack can be inserted in the handle or other device by the user without possibility of improper battery orientation.

A further important object of the invention is to provide a unitary rechargeable battery pack for a battery handle or the like wherein the pack is so constructed that the batteries will always be properly connected in the recharging circuit provided for the handle regardless of how the pack is inserted in the handle.

A more specific object of the invention is to provide a unitary, sealed pack containing one or more rechargeable batteries, which pack has alternatively usable terminals at either end of one polarity and a terminal at the side thereof of the opposite polarity.

Other objects and advantages will become apparent from the following description taken in cojunction with the accompanying drawing, in which.

Figures 1, 2:
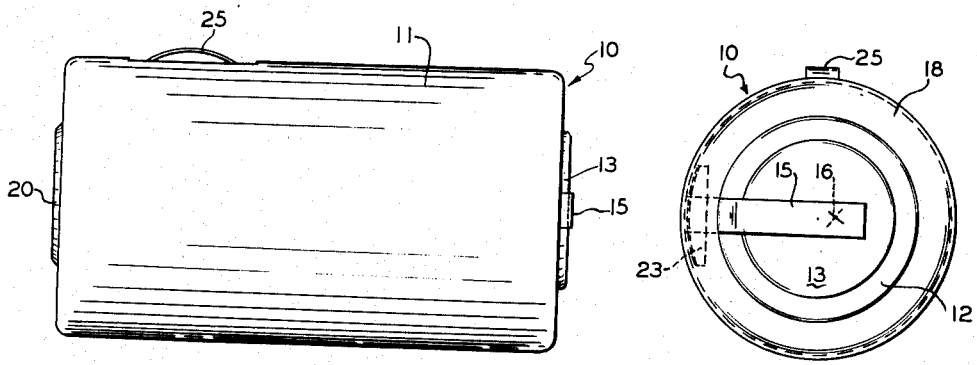
FIGURE 1 is a side elevational view of a battery pack according to the present invention.
FIGURES 2 and 3 are end elevational views of the pack of FIGURE 1 as viewed from the right and left, respectively.
Figures 3, 4:
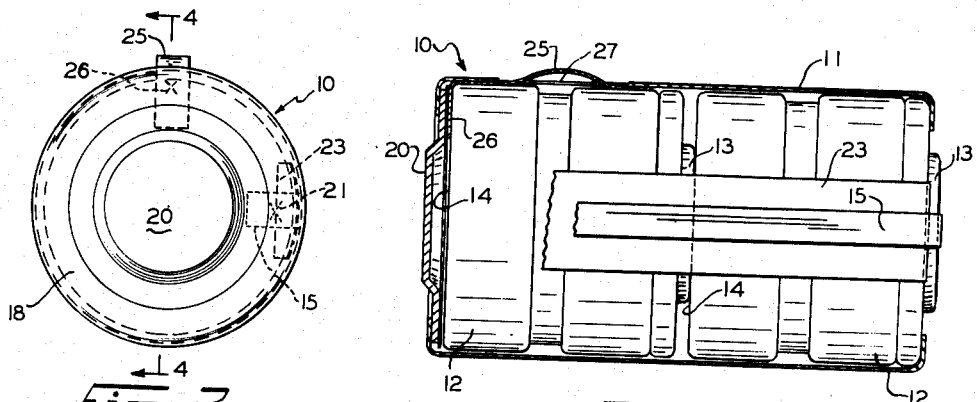
FIGURE 4 is a sectional view on the line 4—4 of FIGURE 3 with certain parts broken away.

Referring now more particularly to FIGURES 1–4 of the drawing, 10 generally indicates a rechargeable battery pack or case which includes a tubular casing or outer wrap 11 which is preferably of a plastic insulating material capable of being spun over or molded at the ends, as best seen in FIGURE 4, for securing the other parts therein. Two batteries 12—12, in the embodiment shown, are arranged in series within the casing 11, with the positive terminal 13 of one battery in contact with the negative terminal 14 of the other battery. The positive terminal 13 of the battery at one end projects from the end of casing 11 and has one end of a flat metal conductor strip 15 secured thereto as by spot welding at 16, FIG. 2. The strip 15 extends the full length of the battery pack along one side of the batteries beneath casing 11 as indicated in the drawings.

Figures 5, 6, 7:
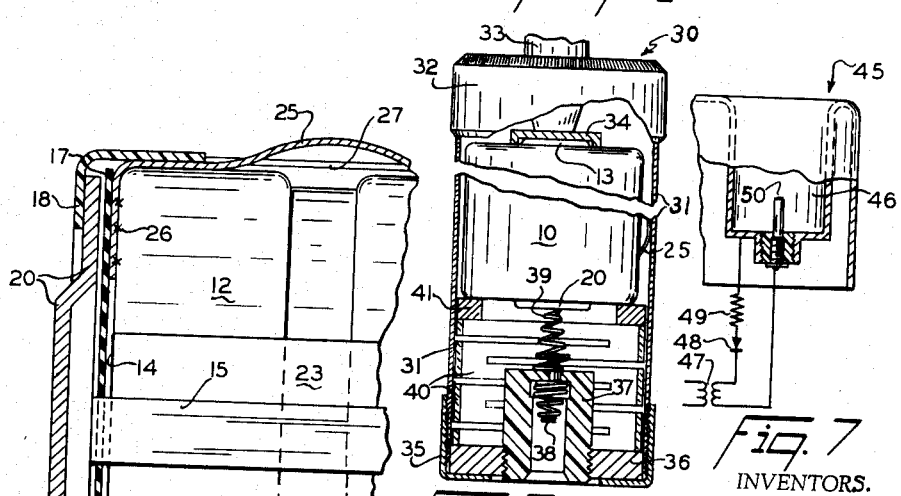
FIGURE 5 is an enlarged fragmentary sectional view of a portion of the pack shown in FIGURE 4.
FIGURE 6 is a fragmentary longitudinal sectional view of a battery handle containing the pack of FIGURE 1.
FIGURE 7 is a fragmentary diagrammatic view on a smaller scale of a recharger unit for recharging the battery handle of FIGURE 6.

At the other end of the casing, best seen in FIGURE 5, the negative terminal 14 of the battery at that end is covered with an insulating disk 17. Secured at the outer side of disk 17 by the spun-over end 18 of casing 11 is a dished terminal disk 20 of conductive material, and the end of conductor strip 15 at this end is folded over and secured as by welding at 21, FIGURE 3, to the inner face of disk 20. Disk 20 thus becomes a second or alternative positive terminal for the battery pack by virtue of its electrical connection with positive terminal 13. A strip of non-conducting tape 23 insulates strip 15 from the batteries 12—12.

Separated from disk 20 by the insulating disk 17, one end of a spring metal strip 25 is secured, as by welding at 26, to the negative battery terminal 14 at this end of the pack. Strip 25 serves as the negative terminal for the battery pack and is bent over the edge of the battery and a curved contact portion thereof extends through an aperture 27 in the casing to project from the side of the pack.

Before describing the operation of pack 10, reference is made to FIGURE 6 which represents a known type of battery handle for electrically illuminated diagnostic instruments more fully shown and described in Patent No. 3,005,090, issued Oct. 17, 1961, to William C. Moore.

The battery handle 30 has a tubular metal body or casing 31 closed at the top by a cap 32 which has a nipple 33 by means of which a diagnostic instrument can be attached to the handle. A contact 34 is connected to the light source of the instrument through insulated conducting means in nipple 33 and an operating switch, not shown. Contact 34 is adapted to contact either of the positive terminals 13 or 20 of a battery pack 10 inserted in body 31, whichever is inserted uppermost in the handle, the circuit for the light source being completed through the spring contact 25, body 31 and nipple 33.

A removable cap 35 is secured to the other end of body 31. Supported by cap 35 and an annular member 36, a hollow post 37 of insulating material has secured therewithin a spring mounted contact 38, adapted to engage a terminal in a recharger device, and a second spring-mounted contact 39 for connecting contact 38 with the lower end terminal of battery pack 10. Alternatively, contact 39 may be omitted and contact 38 may be connected by a wire leading therefrom to contact 34 as shown in the aforementioned Patent No. 3,005,090. A spring member 40 supports a ring member 41 at the lower end of pack 10 and biases the pack upward against the contact 34, as shown.

A recharger unit is fragmentarily shown in FIGURE 7. The recharger has a well 46 with a metal side wall in which the battery handle 30 may be inserted with a sliding fit. A post terminal 50, supported at the bottom of well 46 and insulated therefrom, is connected to one side of the secondary winding of a transformer 47. Post 50 is adapted to enter the hollow post 37 of the battery handle and establish a charging circuit through spring-mounted contact 38 when the handle 30 is inserted in well 46, the return circuit being through the wall of the well, a resistor 49, rectifier 48 and the other side of the transformer secondary.

In operation, the battery pack 10 may be inserted either end first in the battery handle 30. Regardless of whether battery terminal 13 or terminal disk 20 is inserted uppermost, a circuit is established through the contact 34, battery handle operating switch and insulated conducting means in the nipple 33 to one terminal of the instrument light source. This circuit is completed through the other terminal of the instrument light source, the nipple, battery handle body 31 and negative terminal 25 of the battery pack so that the light source will be illuminated when the operating switch of the handle is closed.

By reason of the arrangement of the terminals in pack 10, the batteries are also always in correct polar orientation for recharging. When handle 30 is placed in well 46 of the recharger unit, the positive terminal 13 of the battery series will be charged through spring-mounted contacts 38 and 39, either by direct contact with terminal 13 or through the terminal disk 20 and conductor strip 15. The return side of this charging circuit is through the negative terminal 25 of the battery pack, the body 31 of the battery handle and the wall of well 46 as previously described.

It will be understood that the battery pack 10 may be used in other rechargeable battery powered devices where proper polar orientation of the batteries in the recharging circuit is required. The rechargeable battery or batteries 12 are always correctly arranged and oriented in the pack 10 and, whichever end of the pack is first inserted in the battery powered device, the batteries are also correctly oriented for the charging circuit.

The battery pack 10 also has an advantage which was formerly inherent when the practice was to require factory replacement of the batteries. Before batteries 12 are placed in a pack 10, a number of batteries are tested and their charging and discharging rates and characteristics are carefully charted and recorded. Each set of batteries is then chosen from a group of batteries having the same characteristics so that the batteries in each pack 10 are matched pairs or sets.

As will be apparent to those familiar with the art, the invention can be embodied in other specific forms without departing from the spirit or the essential characteristics thereof. The embodiment disclosed is therefore to be considered in all respects as illustrative rather than restrictive, the scope of the invention being indicated by the appended claims.

What is claimed is:

1. A unitary replacement pack of rechargeable batteries which batteries have positive and negative terminals at the opposite ends thereof, comprising: a tubular cover of insulating material having a side aperture therein, a plurality of batteries arranged in series within said cover, the positive terminal of one battery being exposed at one end of said cover, a conductor member insulated from said batteries and arranged in said cover to project from the other end thereof, means electrically connecting said exposed positive terminal with said conductor member, and a contact member connected to the negative terminal of the battery adjacent said conductor member and projecting through the side aperture in said cover, whereby said battery pack is provided with positive terminal means at either end thereof and negative terminal means at its side.

2. A unitary replacement pack of rechargeable batteries which batteries have positive and negative terminals at the opposite ends thereof, comprising: an elongated casing of insulating material having a side aperture therein, a plurality of batteries connected in series and confined within said casing in end to end relation, the positive terminal of one battery projecting from said casing at one of its ends, the negative terminal of another battery being positioned adjacent the other end of said casing, a terminal member of conductive material insulated from said other battery negative terminal and positioned in said casing to project from said other end, means electrically connecting said projecting positive battery terminal with said projecting terminal member, and a contact member connected to said other battery negative terminal and projecting through the aperture in said casing, whereby said pack may be inserted either end first in an instrument adapted for connection in a circuit for recharging the batteries.

3. A unitary replacement pack of rechargeable batteries which batteries have positive and negative terminals at the opposite ends thereof, comprising: a tubular cover of insulating material having a side aperture therein, a plurality of rechargeable batteries arranged in series in end to end relation within said cover, said cover having means at each end thereof to confine said batteries therewithin, the positive terminal of one battery projecting from one end of said cover, the negative terminal of another battery being located adjacent the other end of said cover, an insulator member overlying said other battery negative terminal, a conductor member overlying said insulator member and positioned within said cover to project from said other end thereof, means electrically connecting said projecting positive terminal with said conductor member, and a contact member connected to said negative terminal and projecting through the side aperture in said cover, whereby said pack may be inserted either end first in an instrument adapted for connection in a circuit for recharging the batteries.

4. A unitary rechargeable battery pack comprising: a tubular outer casing of insulating material having an aperture therein, a plurality of batteries each having a positive terminal at one end and a negative terminal at the other end, said batteries being arranged end to end within the casing with the positive terminal of one battery in contact with the negative terminal of the next battery, a terminal disk mounted at one end of said casing and insulated from the adjacent battery terminal at that end, a conductor strip extending the length of the casing and insulated from the batteries therein, said strip being connected at one end with the battery terminal at that end and connected at the other end with said terminal disk, and a spring contact member having a portion extending through said casing aperture and being connected at one end to the battery terminal adjacent said disk.

5. Structure as defined in claim 4 in combination with a battery handle having a terminal contact at one end and another terminal contact at its side for electrical connection with said battery pack, said handle having means for obtaining easy access to a battery pack contained therein.

6. A constant polarity pack of rechargeable batteries for use with a battery handle having alternate means for illuminating an instrument attached to the handle and for connecting the handle to a charger unit for recharging the batteries, comprising: a tubular outer casing of insulating material having an aperture in the sidewall thereof, a plurality of batteries in a series confined within said casing and having a positive battery terminal projecting from one end thereof, a negative battery terminal being adjacent the other end of the casing, a terminal disk insulated from said negative terminal and projecting from said casing other end, electrical conductor means connecting said projecting positive terminal and said disk, and a contact member connected to said negative terminal and projecting through said casing aperture, whereby the pack may be inserted either end first in said handle and be properly oriented therein.

7. A constant polarity pack of rechargeable batteries each having a positive terminal at one end and a negative terminal at the other end, comprising: a tubular outer insulating casing having an aperture in the sidewall thereof, a plurality of batteries arranged end to end in series within said casing, a terminal disk secured at one end of the casing adjacent a negative battery terminal, means insulating said disk from said terminal, a conductor strip extending the length of said casing therewithin, means insulating said strip from said batteries, one end of said strip being in contact with the positive battery terminal at that end of the casing and the other end of the strip being in contact with said terminal disk, and a spring contact strip having a portion extending through said casing aperture and having one end in contact with the negative battery terminal adjacent said disk, whereby both ends of the pack have a positive terminal and the negative terminal of the battery series projects from the side wall thereof.

References Cited by the Examiner
UNITED STATES PATENTS

| | | | |
|---|---|---|---|
| 1,277,042 | 8/1918 | Burgess | 136—110 |
| 2,697,128 | 12/1954 | Moore | 136—173 |
| 3,081,366 | 3/1963 | Belove | 136—165 |

WINSTON A. DOUGLAS, *Primary Examiner.*

JOHN H. MACK, *Examiner.*